US010063507B2

(12) United States Patent
Kass et al.

(10) Patent No.: US 10,063,507 B2
(45) Date of Patent: Aug. 28, 2018

(54) DIGITAL COLLABORATION PROCESS ENABLEMENT TOOL

(71) Applicant: Accenture Global Services Limited, Dublin (IE)

(72) Inventors: Alex Kass, Palo Alto, CA (US); Gurdeep Virdi, Bangalore (IN); David Q. Sun, Fremont, CA (US); David Morse, Burlingame, CA (US)

(73) Assignee: Accenture Global Services Limited, Dublin (IE)

( * ) Notice: Subject to any disclaimer, the term of this patent is extended or adjusted under 35 U.S.C. 154(b) by 256 days.

(21) Appl. No.: 14/838,084

(22) Filed: Aug. 27, 2015

(65) Prior Publication Data

US 2016/0072750 A1     Mar. 10, 2016

(30) Foreign Application Priority Data

Sep. 8, 2014   (IN) .......................... 4396/CHE/2014
Aug. 25, 2015  (IN) .......................... 4396/CHE/2014

(51) Int. Cl.

| | |
|---|---|
| *G06F 15/16* | (2006.01) |
| *H04L 12/58* | (2006.01) |
| *H04L 29/06* | (2006.01) |
| *H04L 12/18* | (2006.01) |
| *G06Q 10/10* | (2012.01) |
| *G06Q 10/06* | (2012.01) |

(52) U.S. Cl.
CPC .......... *H04L 51/14* (2013.01); *H04L 12/1859* (2013.01); *H04L 29/06401* (2013.01); *H04L 65/4015* (2013.01); *G06Q 10/06* (2013.01); *G06Q 10/10* (2013.01); *G06Q 10/103* (2013.01)

(58) Field of Classification Search
CPC . H04L 51/14; H04L 12/1859; H04L 65/4015; H04L 29/06401; G06Q 10/103; G06Q 10/06; G06Q 10/10
See application file for complete search history.

(56) References Cited

U.S. PATENT DOCUMENTS

| | | |
|---|---|---|
| 2004/0024875 A1 | 2/2004 | Horvitz et al. |
| 2004/0133646 A1 | 7/2004 | Leukert-Knapp et al. |

(Continued)

OTHER PUBLICATIONS

Patent Examination Report No. 1 corresponding to Australian Patent Application No. 2015218562, dated May 20, 2016, 5 pages.

(Continued)

*Primary Examiner* — Nam T Tran
(74) *Attorney, Agent, or Firm* — Brinks Gilson & Lione

(57) ABSTRACT

A collaboration system provides a combination of technical features to address complex collaboration between geographically distributed teams. The collaboration system implements follow and notify functionality, monitor and engage functionality, and capture functionality. The collaboration system may, for instance, tailor data flows and notifications of significant workflow events via a dynamically tuned subscription model. The system may also create a digital collaboration workspace supported by automation and machine learning functionality. In addition, the system may create documentation of collaboration with automatic recommendation of metadata tags to support search and cataloging of the documentation.

4 Claims, 10 Drawing Sheets

(56) References Cited

U.S. PATENT DOCUMENTS

| | | | | |
|---|---|---|---|---|
| 2004/0243422 A1* | 12/2004 | Weber | ................... | G06Q 10/10 705/319 |
| 2010/0199184 A1* | 8/2010 | Horowitz | ............... | G06Q 10/10 705/319 |
| 2013/0238618 A1* | 9/2013 | Desai | ................... | G06Q 10/101 707/736 |

OTHER PUBLICATIONS

Patent Examination Report No. 2 corresponding to Australian Patent Application No. 2015218562, dated Oct. 26, 2016, 2 pages.

* cited by examiner

DIGITAL COLLABORATION PROCESS ENABLEMENT TOOL

RELATED APPLICATIONS

The present patent document claims the benefit of priority to India provisional Patent Application No. 4396/CHE/2014, filed in the Indian Patent Office on Sep. 8, 2014, and titled "Digital Collaboration Process Enablement Tool," and to India non-provisional Patent Application No. 4396/CHE/2014, filed in the Indian Patent Office on Aug. 25, 2015, and titled "Digital Collaboration Process Enablement Tool," the contents of each of which are incorporated herein by reference in their entirety.

TECHNICAL FIELD

This disclosure relates to improved collaboration among teams potentially including geographically distributed entities.

BACKGROUND

Rapid advances in communication technologies have led to worldwide distribution of high speed communication networks. These networks support collaboration among geographically distributed entities, including individual sensors, individual devices, complex systems, and human actors. However, the workflows that these entities execute may be of very significant complexity, and successful execution often requires accurate and timely status updates and responsive actions. Accordingly, improvements in the digital collaboration architecture between the distributed entities will help meet the increasing technical challenges of geographically distributed collaboration.

DETAILED DESCRIPTION

The collaboration architecture and collaboration logic ("the system") described below provide technical solutions for improved event subscription and notification, collaborative decision making, and decision capture into a knowledge base. The system increases awareness of events within a workflow or across an enterprise, increases the speed and assurance of data flows within a team or at the enterprise level, and allows users to access new data sources by targeting data delivery and preventing a flood of data. The system further supports collaboration via automation and intelligence assistance, facilitating capture and intelligent assistance for accurately creating document metadata.

The system provides a combination of technical features to address complex collaboration between geographically distributed teams. The system implements follow and notify functionality, monitor and engage functionality, and capture functionality. The system may, for instance, tailor data flows and notifications of significant workflow events via a dynamically tuned subscription model. The system may also create a digital collaboration workspace supported by automation and machine learning functionality. In addition, the system may create documentation of collaboration with automatic recommendation of metadata tags to support search and cataloging of the documentation.

Implementations of the system may vary widely. For instance, some implementations may include role-based event subscription that facilitates matching the correct individuals to the data streams relevant to their roles. The subscription may also flexibly change to help the individuals dynamically follow newly identified events of interest. Further, some implementations include a collaboration architecture that facilitates interaction among team members to analyze and respond to events. The collaboration architecture may include a persistent note feature that keeps relevant events and collaborative input on the events at the forefront of the information stream to the individuals. The collaboration architecture may also proactively suggest individuals with whom to collaborate for any given event. The system also supports intelligent tagging of events and knowledge capture to assist with future event handling.

While some examples of system operation are described below with reference to an oil drilling operation, the system is not limited to any particular field of endeavor, and may be implemented in any number of other business contexts. As examples, the system may facilitate collaboration in a manufacturing setting, where different manufacturing processes may be taking place at geographically distributed locations; in a health care setting, where doctors, nurses, and administrative staff collaborate to provide health care; in a government agency, where agents, staff, and other support personnel collaborate to provide or execute government functions or services; or any other environment.

Figure 1:
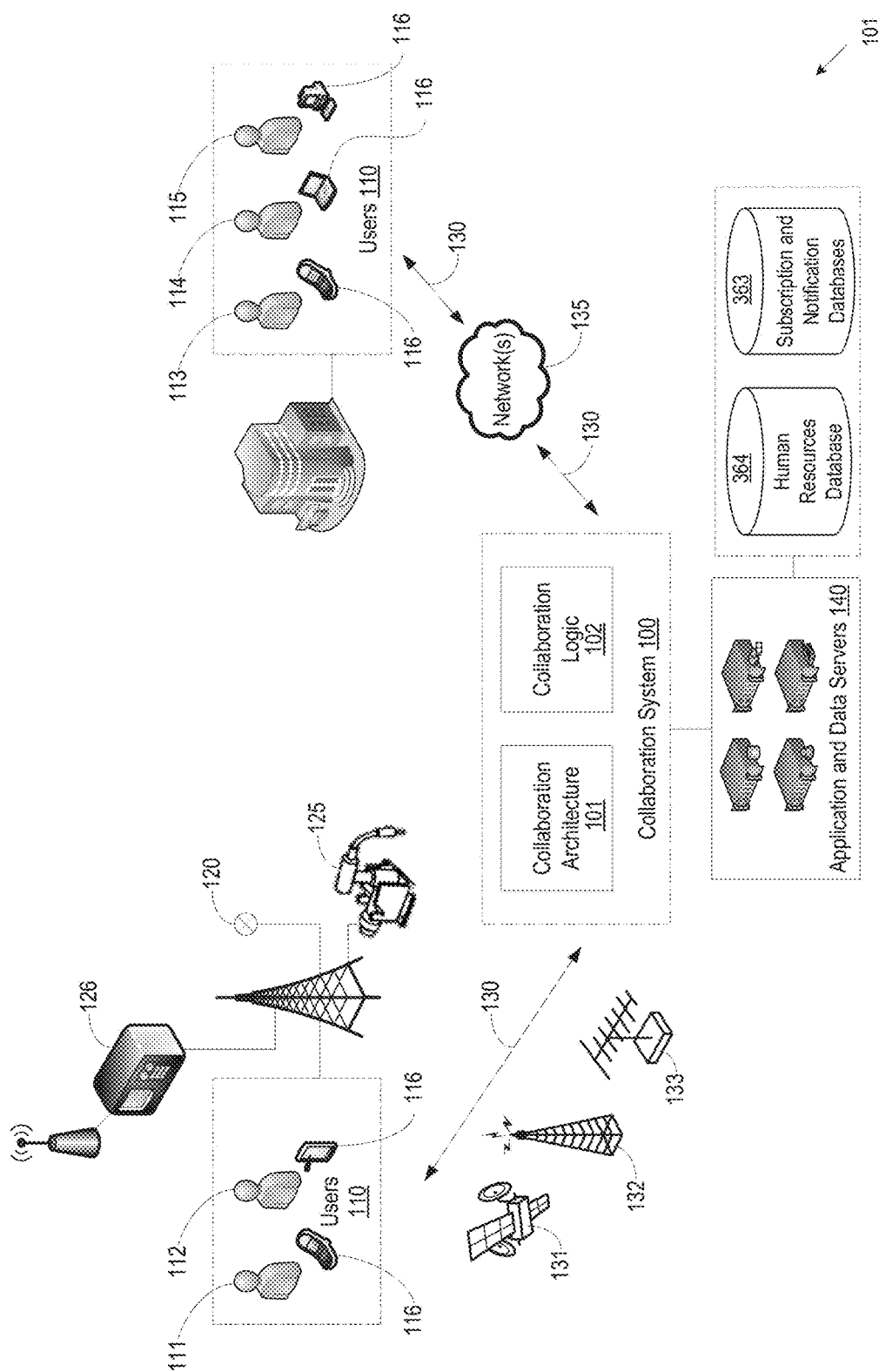
FIG. 1 shows an example of an environment in which the system may be employed.

With reference to FIG. 1, the system 100 may interface with and to various sensors 120, different communication pathways 130, and one or more application and data servers 140, which may collectively facilitate communication and collaboration between any number of users 110. The users 110 may interface with the system 100 using user devices 116, e.g., personal or laptop computers, tablet computers, smartphones, pagers, or other devices.

The users 110 of the system 100 may serve a number of different roles 111-115. As illustrated in FIG. 1, for example, the system 100 may facilitate collaboration between an operator 111, a production foreman 112, operations engineers 113, accounting employees 114 and regulatory employees 115 (e.g., environmental health and safety employees 115). The users 110 may be geographically distributed, for example, where the operator 111 and production foreman 112 are located at a production location and the operations engineers 113, accounting employees 114, and regulatory employees 115 are located at the corporate office.

As noted above, a user 110 may have a user device 116, which may be capable of communicating with the system 100. The system 100 may facilitate collaboration between different users by allowing bidirectional communication between a user device 116 and the application and data servers 140. The communication between the user device 116 and the application and data servers 140 may take place over one or more communication pathways 130 (e.g., e-mail, SMS messaging, instant messaging, telephone calls, etc.), which may be transmitted over a satellite network connection 131, a cellular telephone network connection 132, or a wireless network connection 133. Furthermore, data sent over the communication pathways 130 may be routed, in part or in whole, over a network 135, which may include the public internet and private networks on any scale. Users 110 interfacing with the system 100 may do so over different communication pathways 130, and the system 100 may facilitate seamlessly interaction between users 110 interfacing over different communication pathways 130.

The environment 101 may also include any number of sensors 120, assets 125, and any other devices 126 that are capable of communication with the system 100. The devices 126 may have network communication functionality, for example, and accordingly the system 100 may support interaction with any manner of devices considered to be part of the "Internet of Things" (IoT devices).

The sensors 120 may operate independently of, or in conjunction with, any of the assets 125. By way of example, the sensors 120 may include pressure sensors 120 that measure the pressure of an oil well, or laser sensors 120 which are capable of measuring the dimensions of products coming off the production line. The sensors 120 may be deployed across a given location, for example, around a manufacturing floor or around an oil well operation. The sensors 120 may be enabled to communicate information to the system 100 directly over a network connection 131-133. Additionally, or alternatively, the sensors 120 may be able to communicate with a device 116 of the user 110, for example, using a Bluetooth network connection or a near field communication (NFC) connection, which may, in turn, be manually or automatically communicated to the system 100 over a network connection 131-133. The devices 126 may similarly communicate with the system 100, and may provide data feeds to the system 100, which may be updated on demand, at certain intervals, or in a continuous fashion.

The system 100 may center collaboration around one or more types of events, which may be matched to specific user roles 111-115. Events may be certain activities or actions that occur with respect to a sensor 120, an asset 125, a user 110, and any other device 126, taking place at any level of operation, including the enterprise as a whole. An event may be provided to the system 100 by various means, for example a user 110 may create the event or the sensors 120 may be responsible for creating an event. For example, a well operator 111 may notice a change in system operation (e.g., an increase in operating pressure), and may submit this event to the system 100.

More broadly, any user 110, sensor 120, asset 125 or other device 126 may generate an event or provide data to the system 100, which may in turn generate an event. For example, the system 100 may include a sensor 120 which measures the operating pressure of the well, which may automatically generate an event when a critical operating pressure is reached. Additionally, or alternatively, the system 100 may process information received from the sensors 120 or other devices 126 to generate an event. For example, in the manufacturing context, the sensors 120 may provide the system 100 with the precise dimensions of parts coming off the manufacturing line, which the system 100 may use to determine (e.g., by applying six sigma methodologies) if the production process is functioning properly or abnormally and may generate an event accordingly.

The events may be of any level of importance to any particular role, and as described in further detail below, the system 100 may provide users 110 with awareness of those events that are appropriate for the role of the user 110. For example, an operations engineer 113 may not be interested or involved in the same events that an accounting employee 114 may need to follow. That is, the system 100 notifies users of events that are relevant to the roles filled by the users. The system 100 may also provide support for multiple locations (e.g., different oil wells) at different levels of geographic granularity (e.g., from a single well to sets of wells, to an entire field of wells, or to a nationwide well operation), and may allow users 110 of the system to collaborate on events that are geographically distributed across the multiple locations. The system 100 may allow back office users 110, to communicate and collaborate with users 110 who are present, on-site, at the various locations.

The system 100 may implement different elements of collaborative functionality, which, at a high level, may include follow and notify functionality, monitor and engage functionality, and capture functionality. The following description is made with reference to FIG. 2 which illustrates some of the logic that the system 100 may employ in facilitating information delivery and collaboration between different users of the system.

The system 100 may implement an adaptable subscription model in which a user 110 of the system 100 may be able to subscribe to receive, or select to receive, notifications from the system 100 based on various parameters. The system 100, for example, may allow a user 110 to subscribe to receive notifications regarding different events or event types that may be of interest to the user. The system 100 may determine the events or event types by, for instance, analyzing a model of the oil well process and identifying the various event types that may occur over the lifetime of the wells operation. The system 100 may also accept manual input of events and event types that characterize any particular device.

In other implementations, the system 100 may allow a user 110 to subscribe to notifications based on a data object and events corresponding to that data object. For example, the system 100 may allow a user 110 to follow events or event types associated with a specifically identified well. In other words, the user subscribes to events linked to a specific data object, rather than to all such events. The data object to which the event relates to is not limited to a single object (whether an asset, device, sensor, logical or physical element, or other object), e.g., a single well, but may be a group of objects, such as all wells in a particular region or sharing a particular characteristic (e.g., size, output capacity, type, manufacturer, date of construction, or other characteristic). The group of objects may extend as narrowly as a single device or as widely as an enterprise as a whole, e.g., the entire field of wells. By utilizing this adaptable subscription model, the user may target the type of information that the system 100 may deliver to the user 110, and focus the information for relevance to specific objects, and thereby avoid being overwhelmed by all of the possible data and notifications provided by the system 100.

In one implementation, the system 100 may provide the user device 116 with a list of events supported by the system 100, for example, when the user 110 logs into, or connects to, the system 100. The user device 116 may present the user 110 with this list, and the user 110 may be able to select those events which the user 110 would like to follow. The system 100 and/or user device 116 may allow the user to select events at different levels of granularity. For example, a user 110 may be able select events to follow based on a class or type of event (e.g., all production cessation events), based on the asset 125 involved in the event (e.g., all drilling apparatus events), based on a set of devices 126 (e.g., all events relating to devices 126 in a small geographic region of wells), or based on the system that is implicated (e.g., all well operation events). The user 110 is not limited to selecting events at login, and the system 100 may allow the user 110 to change their subscription profile at their convenience and may integrate the option alongside other functionality (e.g., when suggesting relevant documentation).

The system 100 and/or user device 116 may also allow the user 110 to filter the list based on various system or event attributes, for example, filtering the list of events based on well attributes (e.g., size, production rate, stage of production). The list of events that are provided to the user device 116 may also be filtered by the system 100 based on attributes of the user 110. The system, for example, may associate, or map, an event to one or more user roles 111-115, and the system 100 may limit the events that are presented to a user 110 for selection based on the role of the user 110. As a specific example, the system 100 may associate certain critical well alert events with the production foreman role 112 and the operations engineer 113 role. When a user 110 interfaces with the system 100, the system 100 may determine the role of the user 110, for example, by accessing personnel records, and may determine which events or event types are associated with the role of the user 110. The system 100 may, for example, be integrated with a human resources system (e.g., an SAP system), which may utilize a human resources database 364, or file servers (e.g., SharePoint active directories) of the enterprise, where personnel records may be stored. Some users 110 of the system 100 may be associated with one or more roles 111-115 and the system 100 may provide events corresponding to any of these roles. In cases where the user 110 has multiple roles, the system 100 and/or user device 116 may allow the user to filter the list of events based on one of the user's roles.

Furthermore, the events supported by the system 100 may themselves be dynamic, as events may be added, removed, modified, or resolved. The system 100 may provide the user 110 with the option to view those events which have recently occurred or changed, which may allow the user 110 to adapt to changing workflows. The system 100 may similarly accommodate changes in the role of a user 110. In some implementations, the system 100 may also suggest, or automatically enroll the user 110 in, events that stem from events that the user 110 is already subscribed to. The system 100 may, for example, look at a model of the oil well process and identify relationships (e.g., based on a commonality of user role or expertise) between different event types, which the system 100 may use to determine which downstream events to suggest to the user 110.

In other cases, the user 110 may be sent a notification for an event which they have not yet selected to follow (e.g., where a different user includes them as a recipient of a communication or forwards them a notification). The user may be interested in that communication or notification, and may choose to follow that event more closely. The system 100 may also adapt the user's subscription to receive notifications related to that event, and may suggest similar events that the user may be interested in following. The system 100, for example, may be able to predict or suggest event types that the user 110 may want to consider, for example, based on event types that the user 110 is currently following or has followed in the past or based on the expertise of the user 110, which may be determined from the personnel records of the user 110.

As noted above, the system 100 may receive or generate various types of events. A conversation or dialogue may develop around these events, and the system 100 may generate notifications to different users 110 of the system 100. By way of example, the system 100 may receive a SCADA alert from the sensors 120, which the system 100 may interpret as a critical event. The system 100 may send a notification to those users who have chosen to follow that event and/or to those users 110 who are associated with that type of event, for example, an operator 111. The notifications presented to the user 110 may be actionable in nature (e.g., voting on an issue or directing a user 110 to view relevant documentation), allowing the user to take certain actions or steps in response to the event notification. In the broader context, the operator 111 may be able to take certain actions to resolve the problem and may do so without additional help or input from other users 110. The operator 111 may communicate resolution of the problem to the system 100, which may generate a notification indicating that the problem has been resolved. The operator 111 may alternatively decide that an inspection of the well is necessary and may temporarily stop production. The operator 111 may communicate these decisions to the system 100, which may generate additional events and notifications to users 110, for example, notifications to users 110 in the back office, who may be associated with those events (e.g., regulatory 115 or operations engineers 113).

The generated events may also trigger a response from different assets 125, sensors 120, or other devices 126, which may be configured to automatically provide data to the system 100. The system 100 may process this information and generate a notification or relay this information in a notification to the appropriate users 110. Users 110 in the back office may respond with certain inquiries directed towards the operator 111, who may receive a notification from the system 100 indicating that his attention is required. Once the problem has been resolved, the operator 111 may resume operation of the well. The operator 111 may communicate that the well is back online, or a sensor 120 may indicate that the well has come back online, and the system 100 may generate a notification to that effect.

In the above examples, the system 100 may receive communications and transmit notifications over different communication pathways 130 (e.g., to and from different users 110, assets 125, sensors 120, or other devices 126). This multi-channel cross interfacing may increase awareness of events within a workflow or across an enterprise, and increases the speed and assurance of data flows within a team or, more broadly, at the enterprise level.

The system 100 may also allow a user to identify a preferred communication pathway 130, through which the user may receive notifications from the system 100. For example, a user 110 who interfaces with the system 100 using a cell phone 116 may select to receive SMS notifications, whereas a user 110 who interfaces with the system 100 using a laptop 116 may prefer to receive an instant message. The system 100 may also implement a communication pathway 130 hierarchy in which a user may specify a preferred communication pathway 130, a secondary communication pathway 130 and so on. The system 100 may also store the last known communication pathway 130 utilized by the user 110 in interfacing with the system 100, and may use this communication pathway 130 until the user 110 makes use of a different communication pathway 130.

The system 100 may also integrate with other enterprise systems, allowing for seamless interfacing with the user 110. For example, the system 100 may be able to communicate directly with a productivity application of a user (e.g., a web browser, word processing or spread sheet application), which may provide a notification within the productivity application itself (e.g., by delivering the event to a notification plug-in running in the application environment). The user may also be able to leverage the functionality of the productivity application in responding to the notification. For example, an operations engineer 113 may be able to use a productivity application to remotely control a asset 125. The system 100 may be able to process information from various sensors 120 to determine when an adjustment may be warranted and may calculate a suggested adjustment to the operating profile of the asset 125. The system may provide the operations engineer 113 with a notification suggesting adjustment of the asset 125, which the operations engineer 113 may receive directly within the productivity application. The operations engineer may be able to accept or modify the suggestion and adjust the operation of the asset 125.

The system 100 may also allow users 110 to monitor the different events that they are following by providing a digital collaboration workspace. The digital workspace may provide a user 110 with a way to efficiently access and manage the various events with which they may be involved. An operations engineer 113, for example, may be responsible for providing service to several different well operations, which may experience different events that may be at different stages of resolution. The user 110 may have interfaced with the system using different user devices 116 and different communication channels 130. The digital collaboration workspace may serve to aggregate these disparate communications and present the user 110 with an organized and curated workspace.

The digital workspace, for example, may present the user 110 with a newsfeed, which may identify any new events or notifications that may need the user's attention and additional developments or discussions in events that the user is interested in. The digital collaboration workspace may also serve to aggregate additional information regarding the different events, so that information needed to respond may be available in a single location. The digital collaboration workspace, for example, may provide the user with relevant data feeds, for example, machine data (SCADA), or device data feeds, or access to relevant documents (e.g., from the system knowledge base).

The digital collaboration workspace may also provide the user 110 with a comprehensive view of a given operation (e.g., a well profile view). The user 110, for example, may have interfaced with the systems at different stages of an event, and the digital collaboration workspace may present a complete view of the situation (e.g., from the first alert to its ultimate resolution). For example, in the subscription model described above, a user may choose to receive notifications for certain critical events, while foregoing receipt of notifications with respect to other less critical events. The latter set of notifications may, nevertheless, provide additional context for the problem being addressed, which may help a user to address more complex issues. For example, the operations engineer 113 may only receive an event notification when the well operator 111 stops production on the well, and may not have received a notification regarding the original SCADA alert, which may have triggered production cessation. In such cases, the operations engineer 113 may turn to the digital collaboration workspace to obtain this additional information, which may provide a deeper understanding of the problem and provide insights as to its solution. The workspace, more broadly, may present a complete view of the well's operation, including active events and discussions, live data feeds, and relevant documentation.

A user 110 may also manipulate the presentation of information in the digital collaboration workspace, allowing users to filter the information to present the information that is immediately necessary. For example, a user 110 may be following events related to several data wells, but may only be concerned with data relating to a couple of the wells. The user 110 may be able to filter the content that is presented in the digital workspace (e.g., through a series of controls and/or drop down menus). The interface may also be customized based on a user's role in the process. For example, an operations engineer 113 may want access to SCADA data feeds while an accounting employee 114 may not need such data. The digital collaboration workspace may allow for cross-platform support and may enable the user to interface with the digital collaboration workspace using any user device 116, where the workspace may be optimized for the device being used.

The digital collaboration workspace may also allow for heightened awareness of certain events by providing a persistent note feature that keeps relevant events and collaborative input on the events at the forefront of the information stream to the individuals.

The system 100 or an individual user, for example, may mark events and their related notifications as having particularly high importance, which the digital collaboration workspace may give persistent status. In such cases, the digital collaboration workspace may place a persistent note at the top of a user's newsfeed. The persistent note may remain fixed at the top of the newsfeed until certain conditions or interactions are met. For example, an event that stops production on a well may be marked as critical, and related notifications may be placed at the top of the user's news feed until the well comes back online (e.g., when a operator 111 communicates this to the system 100 or when a sensor 120 provides a similar indication). Additionally, or alternatively, the system 100 may automatically mark certain events as persistent notes (e.g., critical SCADA events), which can later be deprecated to non-persistent status. The system 100 may also choose to include (i.e., promote to high importance) related elements with the persistent note, for example, conversations and discussions that may develop around the event. Similarly, the system 100 may include, related events, whether upstream or downstream of the original event marked for persistent notification. The additional elements may be included within the same persistent note and/or spawn additional persistent notes.

The persistent notifications may be specific to the digital workspace of the user or global to all users of the system 100, and the ability to mark events for treatment as a persistent notification may be limited to certain users 110 or certain user roles 111-115 (e.g., production foreman 112). Moreover, as the digital collaboration workspace may allow users 110 to engage and collaborate with one another (as described in greater detail below) the persistent notes may also be collaborative in nature. For example, once a note has been promoted to persistent status it may be placed atop the newsfeed of each user 110 that is following and/or who is associated with the event. Subsequent conversations and discussions between team members may thus appear on the newsfeed of all team members.

The digital collaboration workspace may also help to coordinate efforts between different users 110 of the system 100 and may allow for interaction amongst different members of a team. The workspace, for example, may help in assembling a team to address an event, which may allow for a faster response and may also allow for adaptation to dynamically changing events and situations. The system 100 may, for example, suggest users 110 that are able to help address a particular event, for example, by determining the different user roles 111-115 that are associated with an event and identifying what roles 111-115 are absent in the assembled team (e.g., by consulting records in the human resources database 364). In making this suggestion, the system 100 may look at various factors, including, for example and without limitation, the number of similar events that the user 110 has previously dealt with, the technical expertise of the user 110, the number of active events that the user 110 is engaged in, and the geographical proximity of the user 110 to other members of the team or to the location of the event or operation.

The digital collaboration workspace may further provide communication functionality, which may allow users 110 of the system to directly engage and communicate with one another. The digital collaboration workspace may assist users 110 in reaching out to suggested team members, for example, by providing contact information for the recommended user 110. The system 100 may also facilitate the act of collaboration itself, for example, by providing an instant messaging service, teleconferencing capabilities, and video conferencing features, which may be integrated within the digital collaboration workspace. The workspace may also provide messaging capabilities between the newsfeeds of different users.

In providing the communication functionality, the system 100 may support simultaneous communication over different communication pathways 130, and may allow for cross-pathway communication. For example, the system 100 may allow users 110 to conference with one another where some users 110 may participate using a telephone and other users 110 may video conference using a smartphone. The method of collaboration may depend on user 110 preferences or capabilities of the user device 116. For example, a user of a mobile device 116 having 4G/LTE cellular access may have video conferencing enabled whereas a user 110 having 2G cellular access may communicate via SMS messaging.

The system 100 may also enhance the collaborative experience by automation and intelligence assistance, for example, by providing users 110 with relevant documentation (e.g., from a document repository or previously captured knowledgebase) or relevant data feeds (e.g., live data from the sensors 120, assets 125, and other devices 126).

As just mentioned, the digital collaboration workspace may leverage information contained within a captured knowledgebase, which may include, for example and without limitation, information and insights gained through the resolution of past events and problems. To that end, the system 100 may automatically process conversations and discussions to capture this information, for example, by using natural language processing techniques. For example, a team of users 110 may successfully resolve an event (e.g., a SCADA alert), after which the system 100 may analyze the dialogue between the team members to capture how the issue was solved, which may provide forward guidance to users 110 trying to resolve similar events. While the above example described the knowledge capture process following resolution of a problem, the knowledge capture process may also take place when the results achieved to that point are good enough though not complete (e.g., where a temporary solution has been implemented) or when a sufficient amount of input has been received (e.g., after each team member has contributed their input). The knowledge capture process may also be triggered by a user 110 of the system 100, who may assist the capture process by identifying or providing information of relevance.

The knowledge capture process may involve processing the conversation and discussions surrounding an event and identifying and tagging relevant metadata contained therein, which may be stored as an entry in the knowledge base. For example, the knowledge capture process may identify and record what event(s) were addressed, what operation location it was attributed to, who the team members are, and in some situations when the issue will be revisited. As another example, the system 100 may identify the data feeds and documentation, including existing knowledge base resources that were used to address the issue being processed. The knowledge capture process may also look at the social interactions that took place in responding to an issue, for example, capturing when different users 110 were added to the team and/or those users 110 that were most active in the conversation. As mentioned above, the information stored in the knowledgebase may automatically be presented to the user 100, for example, based on a commonality of events or issues or when the same event is revisited down the line. The system 100, however, may also allow users 110 to search the knowledgebase (e.g., based on the tagged metadata).

Figure 2:
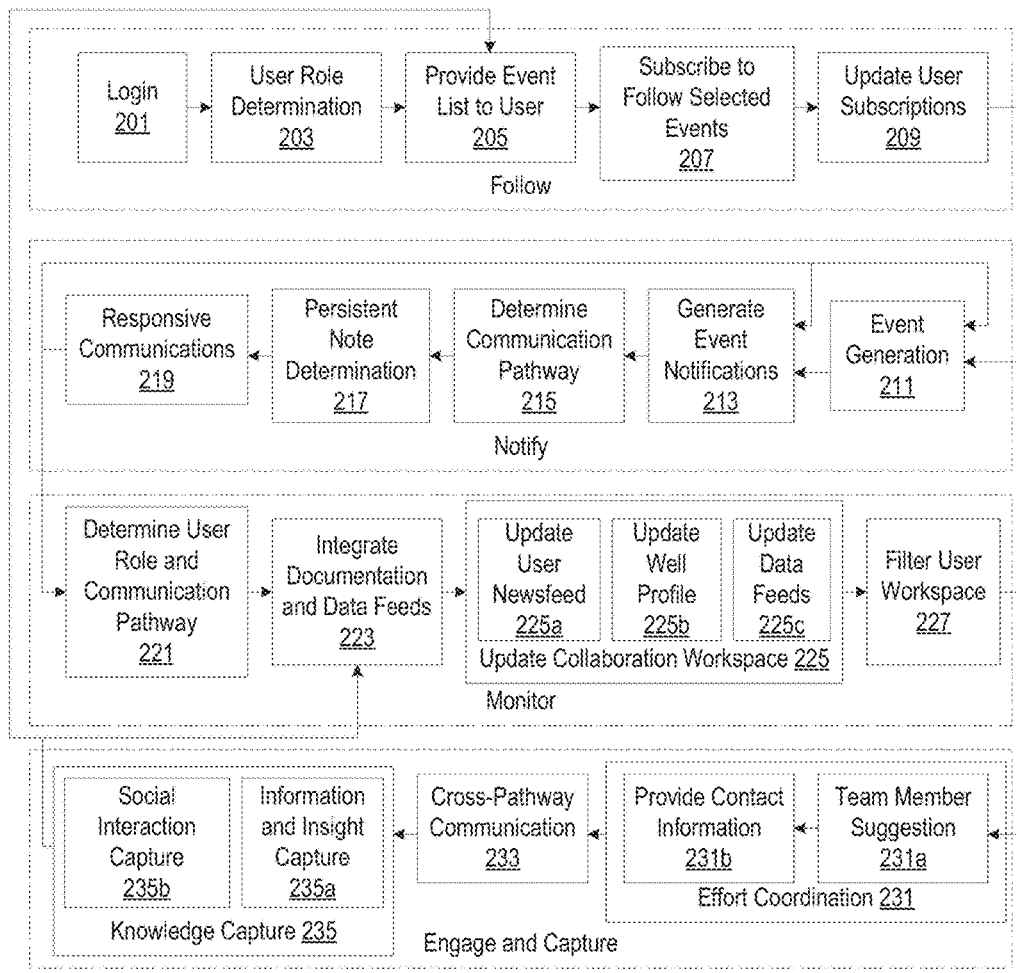
FIG. 2 illustrates, at a high level, some of the logic that the system may employ in facilitating information delivery and collaboration.

One implementation of the system 100, using the features just described, is illustrated in FIG. 2. Additional reference may be made with reference to FIGS. 6-10, which illustrate example user interfaces that may be presented to the user 110. The system 100 may recognize that the user has logged in to or has connected with the system (201). The system 100 may then determine the user's role and identify those events for which the user may be a match (203). The system 100 may provide this list of matching events to the user 110, which may be displayed on the device of the user 116 (205). The system 100 accepts event selections from the user, and subscribes the user to those events (207). The system 100 may update the subscription of the user based on the user selection (209), e.g., to add, remove, or change the set of events to which the user is subscribed. In some implementations, the system 100 may provide additional selection criteria to facilitate specific selection of and subscription to events. For instance, the system 100 may allow the user to select events from specific objects, e.g., wells or other machines that exceed a pre-determined monthly output. The selection criteria may act as filters (e.g., corresponding to attributes of the device) that provide fine grained control over selection of the devices that generate events to which the user subscribes. The subscriptions may be to <event, object>pairs, so that the user receives those events that apply to specific objects, and not all objects. For instance, a user may subscribe to well malfunction events only for wells in a specific sub-region of a field of wells.

Figure 6:
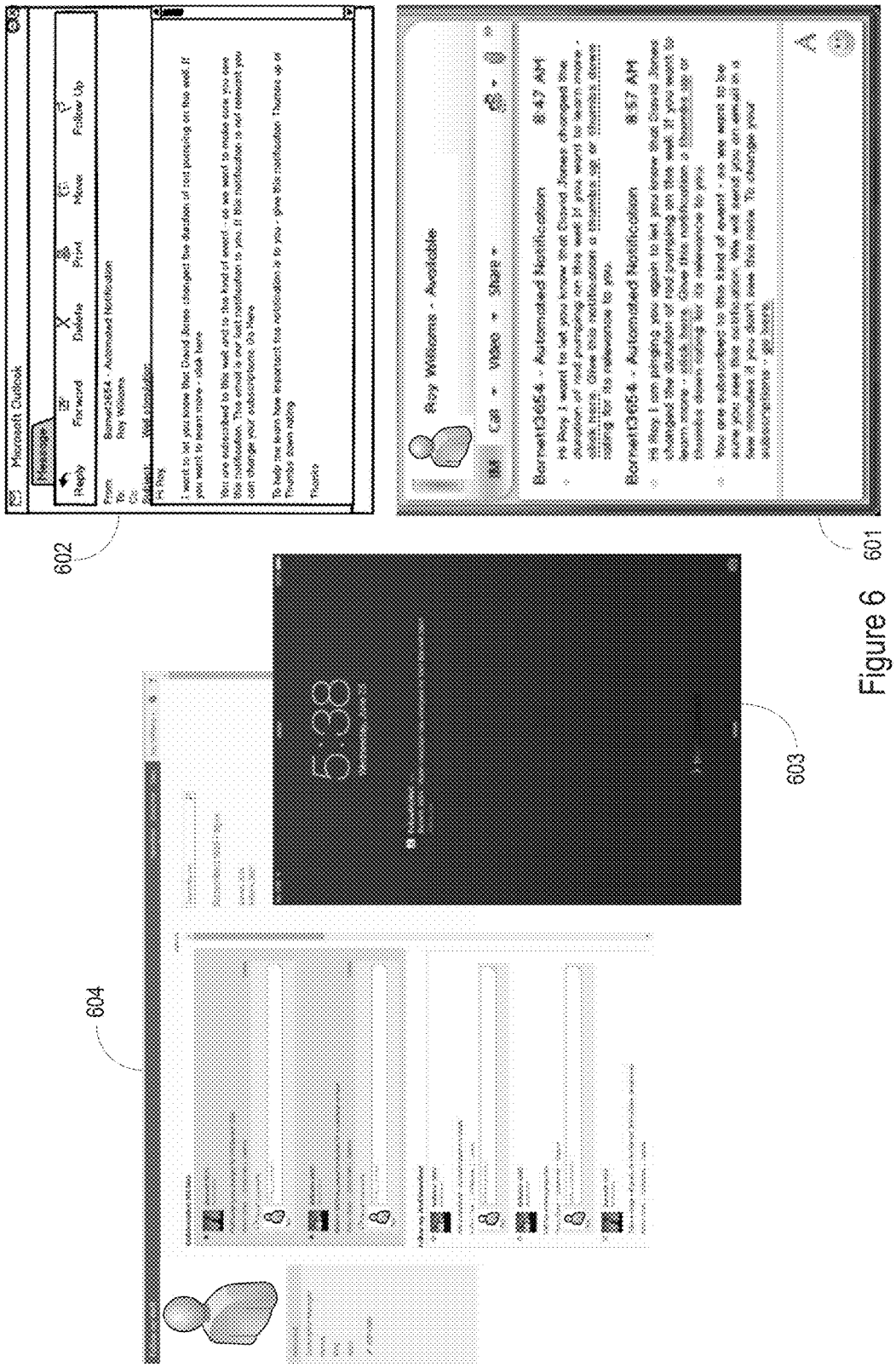
FIGS. 6-10 illustrate examples of different interfaces that may be provided to a user of the system.

When the system 100 learns of an event that matches the users 110 subscription preferences (211), the system 100 may generate a notification to send to one or more users 110 or to other devices in the system (e.g., sensors 120, assets 125, or other device 126) (213). The system 100 may determine the appropriate communication pathway 130 to send the notifications along (e.g., based on the type of notification being sent and the communication pathway preferences of the user 110) (215). With reference to FIG. 6, for example, the user may be provided with notifications via the user's enterprise messaging client (e.g., Microsoft Lync) (601) and/or via e-mail (602). The user may also receive notification through an application (603) running on their user device 116 (e.g, the delivery of notifications to an iPhone application through the push framework) or in updating the users 110 newsfeed (604) in the digital collaboration workspace (225*a*). With respect to the mobile application, the notification may be displayed in the mobile application itself and/or within a notification dashboard provided by the mobile device.

Figure 7:
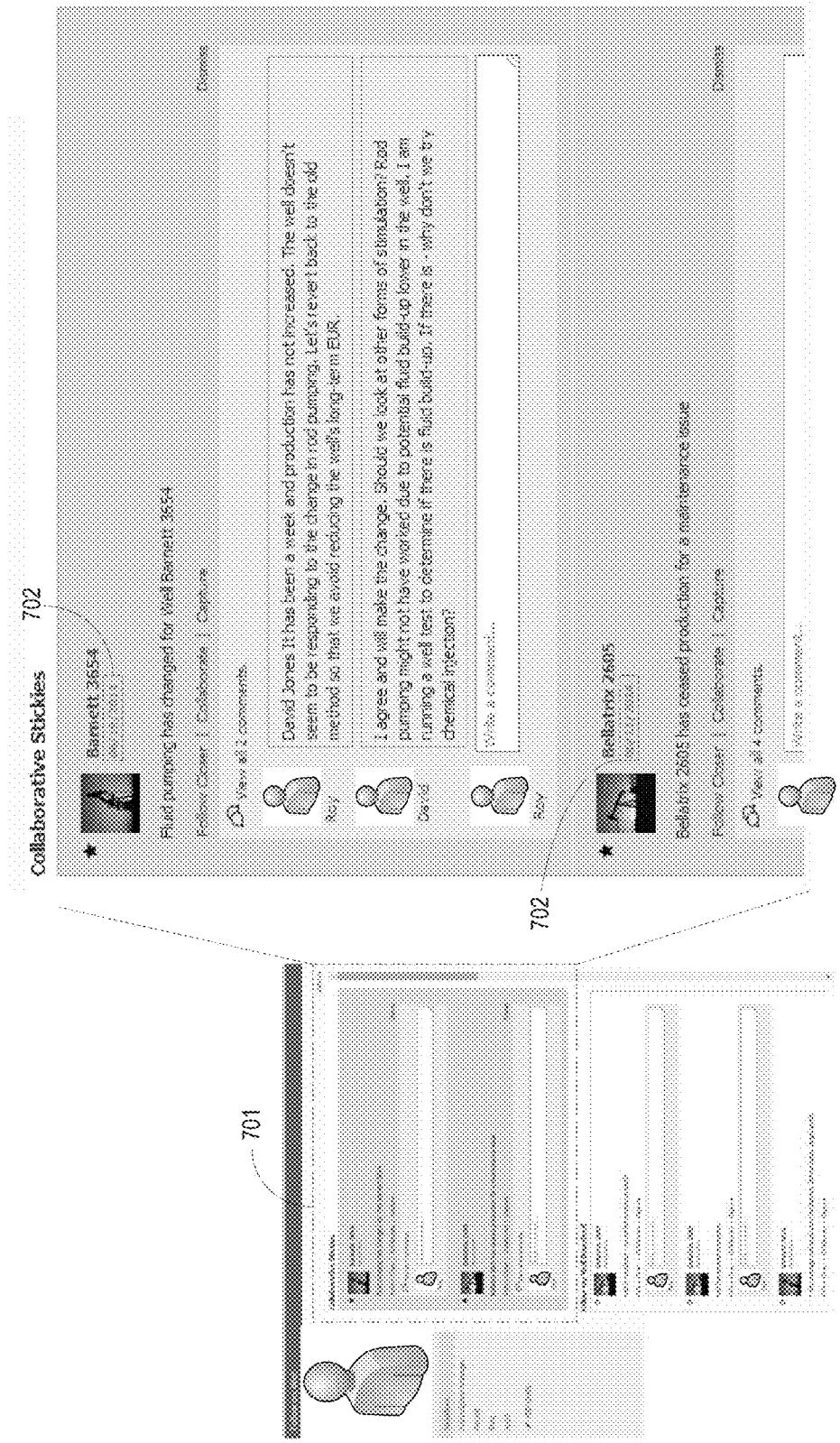

The system 100 may also determine if the event or notification has been assigned persistent status (217), which may affect its presentation in the digital collaboration workspace. As shown in FIG. 7, for example, the notifications having persistent status ("Collaborative Stickies") may be placed at the top of the newsfeed (701), and where more than one notification is given persistent status the system 100 may order them based on various criteria, for example, based on the last response received (702) or event criticality. The users 110 or devices (e.g., assets 125, sensors 120, or other devices 126) may provide responsive communications to the system 110 (219), which the system may process to generate additional events and notifications (211, 213).

The system 100 may process the event or notification in updating the digital collaboration workspace (223), which may be influenced by the role of the user and the communication pathway 130 through which the user 110 is interfacing with the system (221). The system 100 may add, remove, or update documents (e.g., knowledge base references) and data feeds that are presented through the digital collaboration workspace, for example, based on a need identified from a generated event (223). The updating process may also involve updating the newsfeed of the user (225*a*), which may include positioning and updating persistent notes, updating the well profile that may be associated with the event or notification (225*b*), and updating data feeds integrated into the workspace (223*c*). The user 110 may further manipulate the digital workspace by filtering the content that is displayed (e.g., focus on a particular event or well operation) (227).

Figure 9:
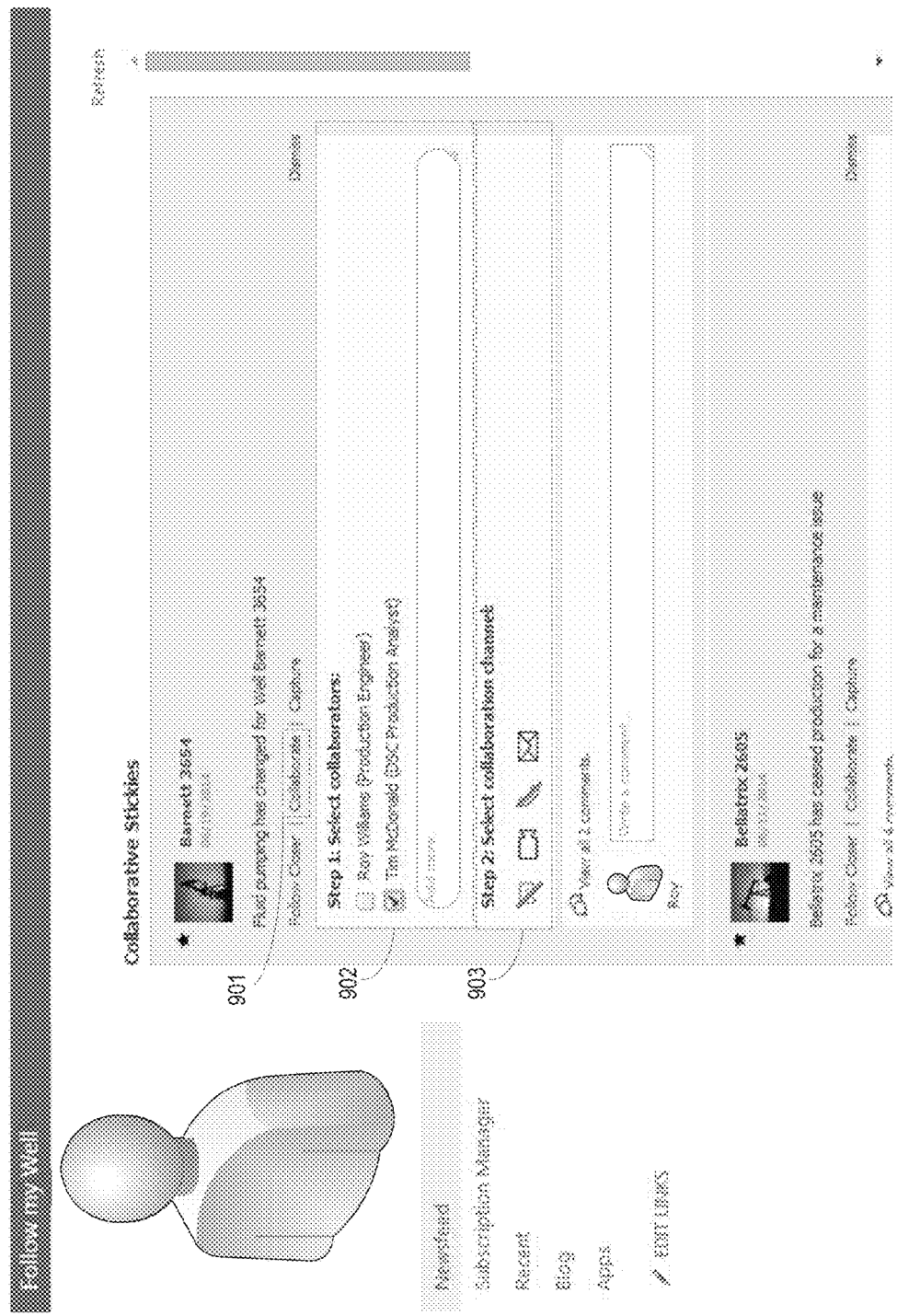

The user 110 may also choose to address an event or notification, and the system 100, through the digital collaboration workspace, may allow the user to engage with other users 110. This may involve suggesting or recommending additional users 110 with whom the user 110 may wish to interact, who may be able to assist the user 110 with the issue or event being addressed (231*a*). As illustrated in FIG. 9, for example, the user may be able to select a "Collaborate" option (901), which may present the user with a list of suggested collaborators, from which the user 110 may be able to select one or more of the users to collaborate with (902).

The system 100 may further assist the user in reaching out to the recommended user 110, for example, by providing the user 110 with contact information of the recommended user 110 (231*b*). The system 100 may also allow the user 110 to directly communicate with other users 110 (e.g., the recommended user 110 or other team members) (231*b*). Again with reference to FIG. 9, as an example, the system 100 may allow the user 110 to select a communication pathway over which the collaboration is to take place (903). The system 100 may also limit the selection of communication pathway based on the capabilities of the various user devices 116 (903). The system 100 may facilitate live, or real-time, communication between users 110 over different communication pathways 130, for example, using videoconferencing or teleconferencing methodologies (233). The system 100 may also facilitate relatively passive communication methods, for example, allowing users 110 to message each other directly through the digital collaboration workspace (e.g., a conversation or discussion occurring in a persistent note of a user's newsfeed) (233). The system 100 may also enrich the conversation by providing users 110 with access to relevant documentation (e.g., from a captured knowledge-base) or pertinent data feeds (e.g., updates from sensors 120, assets 125, or other devices 126).

Figure 10:
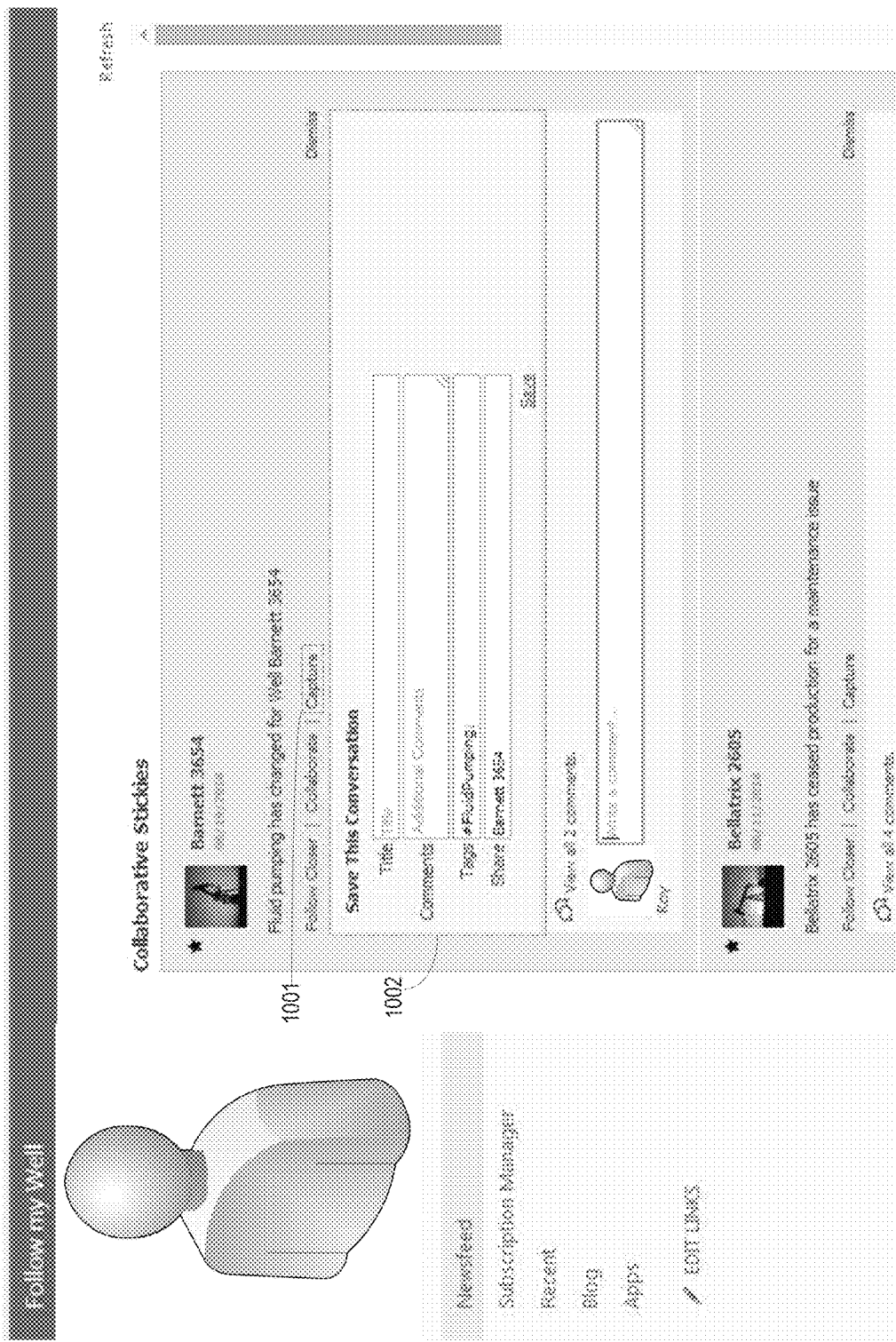

Once the collaboration has met a particular pre-defined criterion or set of criteria, (e.g., commentary has been received from a pre-determined number or set of individuals, or an event has been resolved or dismissed), the system 100 may begin a knowledge capture process 235. In the knowledge capture process 235, the system 100 stores the collaboration, and may generate additional documentation (e.g., metadata tags that characterize the collaboration) representing substantive information and insights regarding the event (235*a*). For example, the system 100 may capture event parameters and/or documentation and data feeds that were used, as well as social aspects of the collaboration surrounding the event (235*b*), including any collaboration components that were exchanged, such as messages, voice communications, images, drawings, test files, video, documents, or any other collaboration component. As illustrated in FIG. 10, the user 110 may be presented with the ability to trigger the knowledge capture process (1001) and may be prompted to assist the system 100 in the process (1002).

Figure 8:
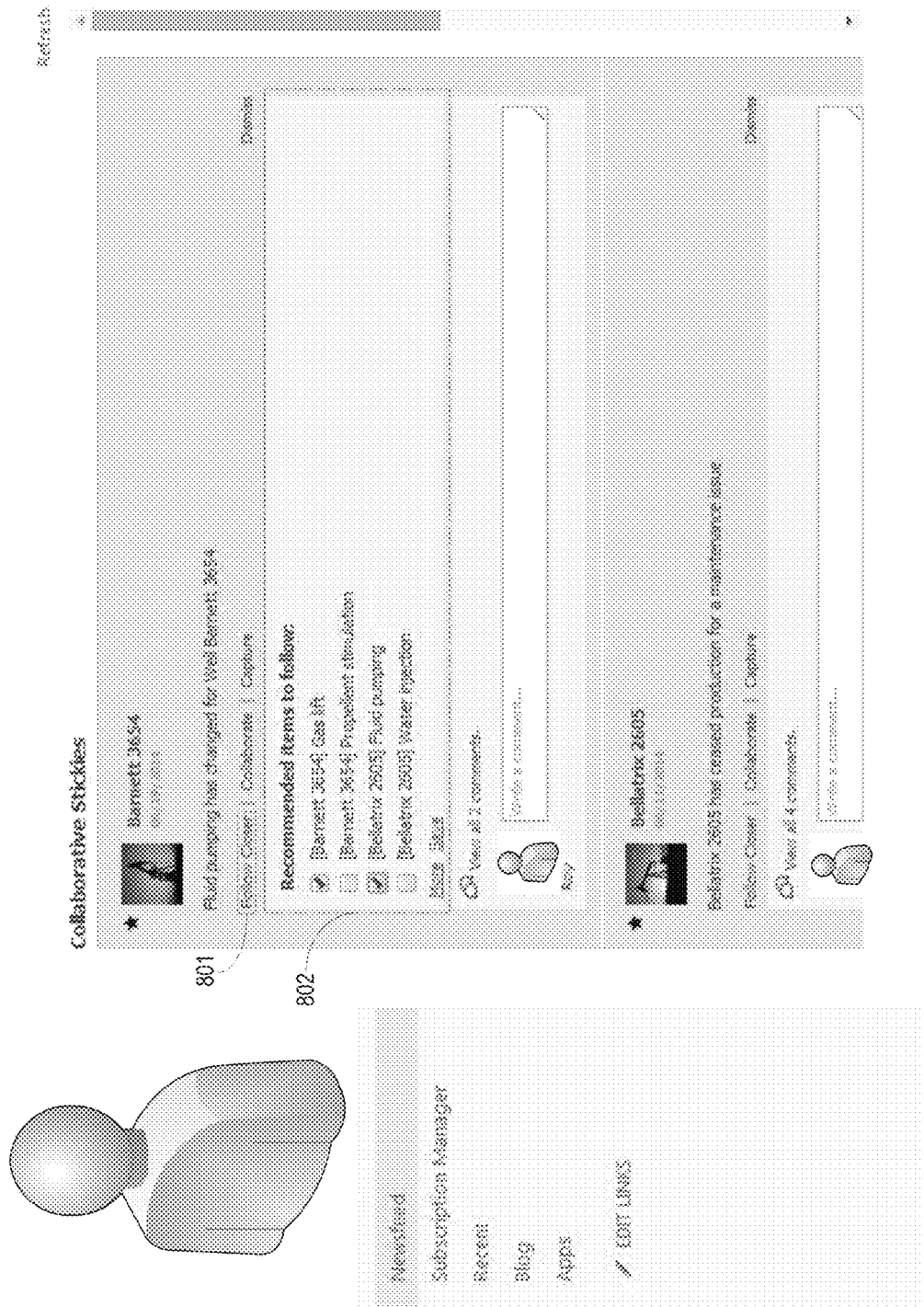

The information gathered in the knowledge capture process 235 may utilized by the system 100 in different ways, for example, in providing a dynamically tuned subscription engine (205) or when integrating documentation and data feeds into the digital collaboration workspace (223). The system 100, for example, may suggest additional events that the user may be interested in following. As illustrated in FIG. 8, the system 100 may allow the user to follow an event more closely (801, "Follow Closer") and may suggest events (802) based on a similarity of location ("[Barnett 3654] Gas lift" and "[Barnett 3654] Propellent stimulation") or a commonality of event type ("[Bellatrix 2605] Fluid Pumping" and "[Bellatrix 2605] Water injection").

Figure 3:
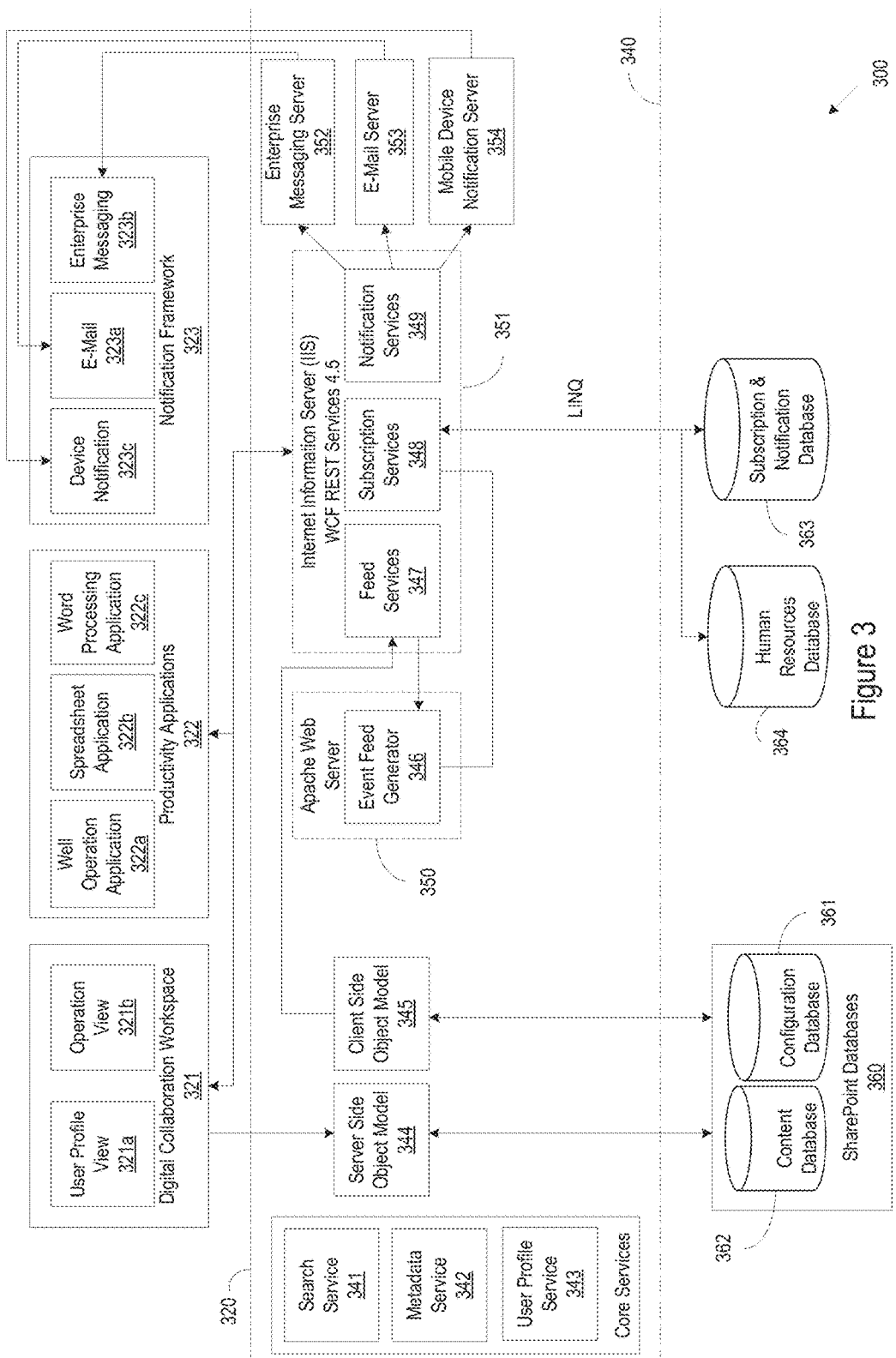
FIG. 3 is an example of a system architecture on which the system may be implemented.

FIG. 3 illustrates an example system architecture 300 which may implement all or parts of the system 100 described above. In this example, the system architecture 300 broadly provides for two different system layers, a presentation layer 320, which consists of some of the elements that may be presented to the user 110, and a business layer 340, which consists of the back-end system components that may support the presentation layer. However, the system architecture 300 may be configured in many different ways. The system architecture 300 may also utilize various databases, including a subscription and notification database 363, a content database 361, a configuration database 362, and a human resources database 364. In some embodiments, the content database 361 and configuration database 362 may be Microsoft SharePoint databases 360, and the databases 361-364 may all be implemented using a relational database architecture (e.g., SQL databases).

As discussed in greater detail above, the system architecture 300 may provide the user 110 with a digital collaboration workspace 321, which may provide a user profile view 321*a* and a well operation view 321*b*. The system architecture 300 may also integrate with various productivity applications 322, also described above, which may include a well operation application 322*a*, a spreadsheet application 322*b*, and a word processing application 322*c*. The system architecture 300 may also feature various notification frameworks 323 that may be used to present the user 110 with notifications over one or more communication pathways 130. The system architecture 300 may, for example and without limitation, feature an e-mail notification framework 323a, an enterprise messaging framework 323b, and a mobile device notification framework 323c.

The business layer 340 may provide support for the presentation layer 320, and may utilize one or more web servers 350,351, for example, an Apache web server 350 and a Microsoft Internet Information Server (IIS) server 351. In operation, the different components of the presentation layer 320 may exchange data and information with components of the business layer 340. For example, the business layer 340 may provide data and information to the presentation layer 320 upon request, for example, by using the HTTP protocol. More particularly, the IIS web server 351 may provide for web services that conform to defined architectural constraints (e.g., REST Services that are part of the Windows Communication Foundation (WCF) web programming model).

By way of example, requests from the digital collaboration workspace 321 may include requests for data relating to the user profile view 321a (e.g., information regarding the user's newsfeed). The presentation layer 320, in placing the requests, may provide the business layer 340 with various parameters. For example, the presentation layer 320 may selectively request data and information for operation views 321b (e.g., where the user 110 has filtered the digital collaboration workspace 321). The business layer 340 may also be configured to push data and information to the presentation layer 320. The business layer 340 may, for example, send notifications (e.g., automatically upon the occurrence of an event) to the user using the notification frameworks 340. The business layer 340 may similarly provide notifications or data to the productivity applications 322 (e.g., a suggested operations adjustment for use with the well operation application 322a).

In servicing requests from, or pushing data to, the presentation layer 320, the business layer 340 may utilize certain additional parameters, for example, those stored in configuration database 361, content database 362, subscription and notification databases 363, and human resources databases 364. The human resources database 364, for example, may allow the business layer to determine the user's role 111-115 or technical expertise, which may influence the data or information that is presented to the user in the digital collaboration workspace 321. The subscription and notification database 363, similarly, may allow the business layer 340 to determine those events that the user has chosen to follow and the communication pathway preferences that the user may have selected.

The business layer 340 may support various types of functionality at the presentation layer 320 by providing certain core services such as, for example, a search service 341, a metadata service 342, and a user profile service 343. The business layer 340 may additionally make use of feed services 347, subscription services 348, and notification services 349. The business layer 340 may also provide an event generator 346 component, which may operate on the Apache web server 350. In providing functionality to the presentation layer 320, the digital collaboration workspace 321 may use a server-side object model (SSOM) 344 to interface (e.g., retrieve, update, and manage) with the SharePoint databases 360 and the feed service 347 may draw upon a client side object model (CSOM) 345, which may similarly be used to interface with the SharePoint databases 360.

With respect to the core services, the search service 340 may allow the presentation layer 320 to implement search functionality, for example, allowing a user 110 interfacing with the digital collaboration workspace 321 to search for different well events or through the captured knowledge base. The user profile service 343 may provide support for the user profile view 321a of the digital collaboration workspace 321. The metadata service 342 may support various aspects of the knowledge capture process, which may involve scanning the conversation and dialogue surrounding an event and identifying relevant information and social interactions contained therein (e.g., using natural language processing techniques).

The presentation layer 320 may also interact with the feed service 347, for example, to support the newsfeeds provided in the user profile view 321 a or the well operation view 321b. The feed service 347 may draw upon and provide input to the event feed generator 346. For example, the feed service 347 may receive as an input an indication that an event has been generated by the system (e.g., based on a communication received from an operator 111 or data received from sensors 120 or other devices 126). The event feed generator 346 may itself be driven by input received from the subscription service 348, which may interface with the subscription and notification database 363. The subscription service 348 may determine which events to provide in the users newsfeed (e.g., based on the users role or filter criteria) and how those events may be prioritized (e.g., based on a notifications persistent status).

The notification services 349 provided by the business layer 340 may interface with notification servers 352-354, which may correspond to the various notification frameworks 323. For example, the business layer 340 may include an e-mail messaging server 353, an enterprise messaging server 352, and a mobile device push notification server 354. The notification services 349 may communicate with the e-mail messaging server 353 (e.g., Exchange mail server) using, for example, the SMTP e-mail protocol. The notification services 349, similarly, may communicate with the enterprise messaging server 352 (e.g. Microsoft Lync Server) using the Unified Communications Managed API (UCMA) which, in turn, may utilize SIP and TCP protocols. The notification services 349 may also communicate with the mobile device push notification server 354 (e.g., Apple™ push notification server) using, for example, the TCP protocol. The notification services 349 may provide support for delivering notifications over different communication pathways and may further provide support for delivery of communications and notifications sent between different communication pathways (e.g., cross-pathway communication).

Figure 4:
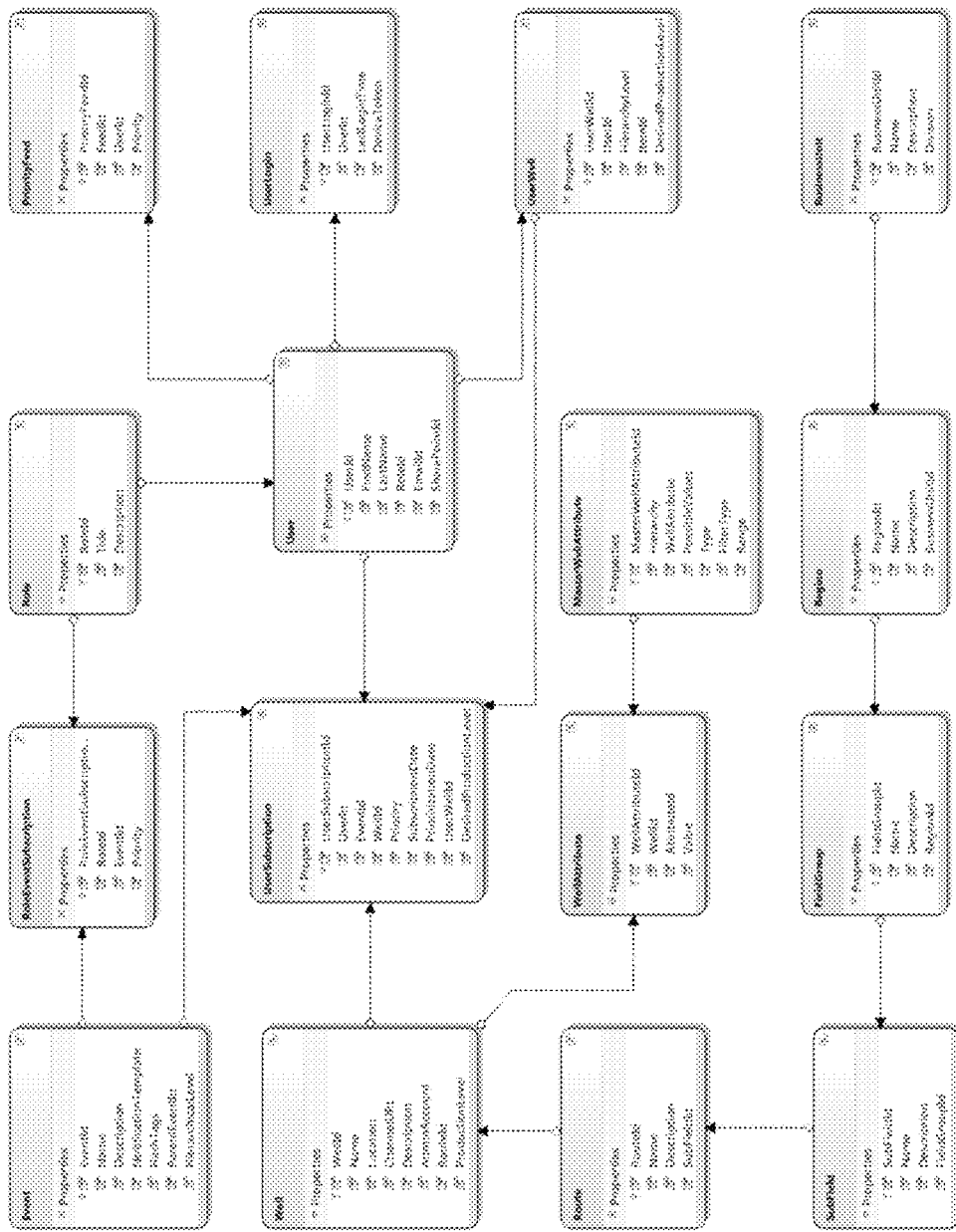
FIG. 4 shows an example of the data model which the system may employ.

FIG. 4 illustrates one example of a data model 400 that the system 100 may implement as part of the subscription and notification database 363 described above. The data model 400 may capture the interaction and interrelationships between users and the events that they may be subscribed to, and may contain data tables relating to users 110, events, and well operations. As illustrated, for example, the user data table may be associated with a role data table, which may capture the association between a user 110 and a user role 111-115. The user data table may also be associated with a user subscription data table, which may capture the different events that the user 110 is following. Similarly, the data model 400, through the role/event subscription data table, may define the relationships between different user roles 111-115 and different events, which the system 100 may use to suggest events for a user to follow. The data model 400 may also capture information regarding the different well operations and may contain data tables storing different well attributes.

Figure 5:
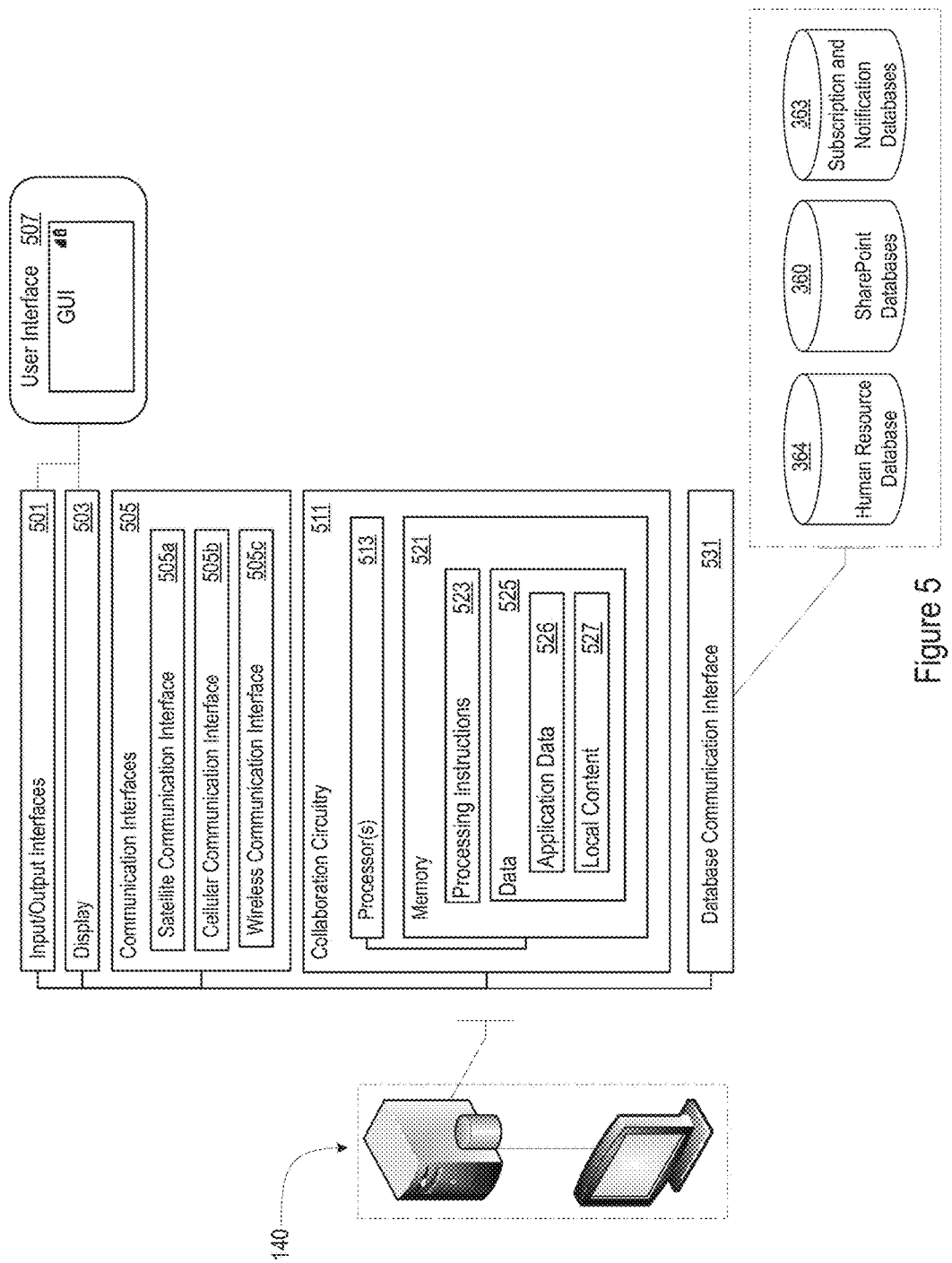
FIG. 5 illustrates an example of the hardware that the system may utilize.

FIG. 5 shows an example implementation 500 of the system 100 and the functionality described above and illustrated in the Figures. The implementation 500 may include input/output interfaces 501, a display 503, one or more communication interfaces 505, collaboration circuitry 511 and a database communication interface 531. As illustrated, the implementation 500 may include communication interfaces 505, which may include a satellite network communication interface 505a, a cellular telephone network communication interface 505b, or a wireless network communication interface 505c. The communication interfaces 505 may also include wired communication interfaces, such as network (e.g., Ethernet) interfaces. The communication interfaces 505 may transmit and receive data from any devices in the field, and may thereby recognize events that have occurred, or receive data from the devices that the system interprets to mean that one or more events have occurred.

The implementation 500 may also include a user interface 507, which may utilize the display 503, and input/output interfaces 501 may provide a graphical user interface, touch sensitive display, voice or facial recognition inputs, buttons, switches, speakers and other user interface elements. Additional examples of the input/output interfaces 501 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The input/output interfaces 501 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The collaboration circuitry 511 may further include a processor 513 and memory 521, which may contain processing instructions 523 and data 525, including application data 526 and local content 527. The processing instructions 523 may be executed by the processor 513 to perform some or all of the system 100 functionality described above. The collaboration circuitry 511 may be in communication with the input/output interfaces 501, display 503, communication interfaces 505, user interface 507, and database communication interface 531. The database communication interface 531 may allow the collaboration circuitry 511 to interface with the SharePoint databases 360, subscription and notification database 363, and human resources database 364.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A system comprising:
a database interface;
a communication interface; and
collaboration circuitry in communication with the database interface and the communication interface, the collaboration circuitry configured to:
retrieve defined roles assigned to geographically distributed entities and communication pathway preference information for the geographically distributed entities from the database interface;
generate an event notification for an event for distribution to the geographically distributed entities;
implement an adaptable subscription model that is operable to select specific entities among the geographically distributed entities to which to send the event notification, where the adaptable subscription model is operable to identify the specific entities responsive to the defined roles in comparison to the event;
tune the adaptable subscription model by subscribing the geographically distributed entities to additional events, where the additional events are selected responsive to the defined roles of the geographically distributed entities;
determine the specific entities to which to send the event notification to based on the adaptable subscription model; and
determine communication pathways, supported by the communication interface, for sending the event noti- fication to the selected entities, responsive to the communication pathway preference information for the selected entities;

digital collaboration workspace circuitry in communication with the database interface and the communication interface, the digital collaboration workspace circuitry configured to:
   provide a newsfeed comprising event notifications for events that a system subscriber is following;
   aggregate communications responsive to the event notifications to obtain an event conversation;
   insert the event notifications and event conversation into the newsfeed to obtain an enhanced newsfeed; and
   generate a digital collaboration workspace user interface comprising the enhanced newsfeed;

persistent status circuitry configured to:
   promote specific event notifications to a persistent status;
   place the event notifications promoted to, persistent status as a persistent note in a prioritized location on the digital collaboration workspace user interface; and
   retain the persistent note in the prioritized location until a pre-determined condition is met;

workspace update circuitry configured to process subsequent events and subsequent event notifications to update the newsfeed provided by the digital collaboration workspace circuitry; and knowledge capture circuitry configured to perform a knowledge capture process to:
   store a collaboration occurrence in a knowledge base,
   process the collaboration occurrence to identify relevant metadata tags, and
   generate additional documentation comprising the metadata tags.

2. The system of claim 1, where the knowledge capture circuitry is configured to trigger the knowledge capture process responsive to a user input.

3. The system of claim 1, where the collaboration occurrence comprises conversations, documentation, data feeds, social interactions, or any combination thereof.

4. The system of claim 1, where the adaptable subscription model circuitry is configured to tune the adaptable subscription model and the workspace update circuitry is configured to update the digital collaboration workspace responsive to the collaboration occurrence stored in the knowledge base.

* * * * *

UNITED STATES PATENT AND TRADEMARK OFFICE
CERTIFICATE OF CORRECTION

PATENT NO. : 10,063,507 B2
APPLICATION NO. : 14/838084
DATED : August 28, 2018
INVENTOR(S) : Alex Kass et al.

Page 1 of 1

It is certified that error appears in the above-identified patent and that said Letters Patent is hereby corrected as shown below:

In the Claims

In Column 17, Claim 1, Line 20 delete the "," between "to" and "persistent"

Signed and Sealed this
Twenty-ninth Day of October, 2019

Andrei Iancu
*Director of the United States Patent and Trademark Office*

UNITED STATES PATENT AND TRADEMARK OFFICE
CERTIFICATE OF CORRECTION

PATENT NO. : 10,063,507 B2  
APPLICATION NO. : 14/838084  
DATED : August 28, 2018  
INVENTOR(S) : Alex Kass et al.

Page 1 of 1

It is certified that error appears in the above-identified patent and that said Letters Patent is hereby corrected as shown below:

In the Specification

In Column 14, Line 12, delete "321 a" and in its place insert --321*a*--

Signed and Sealed this  
Second Day of June, 2020

Andrei Iancu  
*Director of the United States Patent and Trademark Office*